United States Patent
Kawaguchi et al.

(10) Patent No.: US 9,310,489 B2
(45) Date of Patent: Apr. 12, 2016

(54) POSITIONAL INFORMATION TRANSMITTER, COMMUNICATION TERMINAL, AND POSITIONING SYSTEM USING POSITION DATA

(75) Inventors: Takamasa Kawaguchi, Yokohama (JP); Tomoichi Ebata, Machida (JP); Takayoshi Fujioka, Narashino (JP)

(73) Assignee: Hitachi, Ltd., Tokyo (JP)

( * ) Notice: Subject to any disclaimer, the term of this patent is extended or adjusted under 35 U.S.C. 154(b) by 1020 days.

(21) Appl. No.: 13/388,240

(22) PCT Filed: Jul. 13, 2010

(86) PCT No.: PCT/JP2010/061817
§ 371 (c)(1),
(2), (4) Date: Apr. 16, 2012

(87) PCT Pub. No.: WO2011/036934
PCT Pub. Date: Mar. 31, 2011

(65) Prior Publication Data
US 2012/0194383 A1    Aug. 2, 2012

(30) Foreign Application Priority Data
Sep. 28, 2009 (JP) .................................. 2009-221765

(51) Int. Cl.
*G01S 19/11* (2010.01)
*G01S 1/68* (2006.01)
(Continued)

(52) U.S. Cl.
CPC . *G01S 19/11* (2013.01); *G01S 1/02* (2013.01); *G01S 1/042* (2013.01); *G01S 1/68* (2013.01); *G01S 5/0263* (2013.01); *H04W 64/00* (2013.01)

(58) Field of Classification Search
CPC ............. G01S 19/11; G01S 1/68; G01S 1/02; G01S 1/042
USPC .............................................. 342/357.48, 386
See application file for complete search history.

(56) References Cited

U.S. PATENT DOCUMENTS 7,495,614 B2 * 2/2009 Small .......................... 342/458
2009/0115661 A1   5/2009 Torimoto et al.
(Continued)

FOREIGN PATENT DOCUMENTS

JP     05-227066       9/1993
JP     2006-112936 A   4/2006
(Continued)

OTHER PUBLICATIONS

Quasi-Zenith Satellite System Navigation Service—Interface Specification for QZSS (IS-QZSS), V1.0; Japan Aerospace Exploration Agency; Jun. 17, 2008; pp. i-vii, 1-195, A1-A9.
(Continued)

*Primary Examiner* — Cassie Galt
(74) *Attorney, Agent, or Firm* — Foley & Lardner LLP

(57) ABSTRACT

The present invention provides a transmitter comprising: a plurality of antennas; and a radio transmitting part transmitting from each of the antennas a positional information signal containing the same positional information, the positional information being transmitted from the antennas through channels which are different between the antennas. The transmitter enables prevention of the positioning error and the positioning time from increasing by solving problems of null points and signal interferences, problems relating to a positional information transmitter disposed indoors, in a positioning system for acquiring a current position both indoors and outdoors.

11 Claims, 16 Drawing Sheets

(51) Int. Cl.
*G01S 1/02* (2010.01)
*G01S 1/04* (2006.01)
*G01S 5/02* (2010.01)
*H04W 64/00* (2009.01)

(56) References Cited

U.S. PATENT DOCUMENTS

| | | | |
|---|---|---|---|
| 2009/0256742 A1 | 10/2009 | Kawaguchi et al. | |
| 2009/0286556 A1* | 11/2009 | Yumoto et al. | 455/456.6 |
| 2010/0194636 A1 | 8/2010 | Ebata et al. | |
| 2011/0050493 A1 | 3/2011 | Torimoto et al. | |
| 2011/0201359 A1 | 8/2011 | Naganuma et al. | |

FOREIGN PATENT DOCUMENTS

| | | |
|---|---|---|
| JP | 2006-522920 A | 10/2006 |
| JP | 2007-278756 A | 10/2007 |
| JP | 2009-133731 A | 6/2009 |
| JP | 2009-250932 A | 10/2009 |
| JP | 2010-038850 | 2/2010 |
| JP | 2010-183125 A | 8/2010 |
| JP | 2010-226707 A | 10/2010 |
| JP | 2011-080847 | 4/2011 |
| KR | 10-2004-0098088 A | 11/2004 |

OTHER PUBLICATIONS

PCT International Search Report and Written Opinion on application PCT/JP2010/061817 mailed Aug. 10, 2010; 11 pages.
Japan Patent Office action on application 2009-221765 dated Mar. 8, 2012; 3 pages.

\* cited by examiner

| Boundary Flag | PRN Number (1) | PRN Number (2) | Latitude | Longitude | Altitude |
|---|---|---|---|---|---|
| 1 | 173 | 174 | North Latitude 35.1234 | East Longitude 139.3456 | 30m |
| 501 | 502 | 503 | 504 | 505 | 506 |

| Boundary Flag | Latitude | Longitude | Altitude |
|---|---|---|---|
| 1 | North Latitude 35.1234 | East Longitude 139.3456 | 30m |
| 601 | 602 | 603 | 604 |

FIG.11

| Operation Mode | Set Channel | | | | |
| --- | --- | --- | --- | --- | --- |
| Indoor/Outdoor | Correlator (1) | Correlator (2) | Correlator (3) | Correlator (4) | Correlator (5) |
| Indoor/Outdoor | Satellite 8ch | Satellite 11ch | Satellite 15ch | Satellite 20ch | IMES 180ch |
| Indoor | Satellite 8ch | IMES 174ch | IMES 175ch | IMES 179ch | IMES 180ch |

FIG.16

| Operation Mode | Set Channel | | | | |
|---|---|---|---|---|---|
| | Correlator (1) | Correlator (2) | Correlator (3) | Correlator (4) | Correlator (5) |
| Outdoor | Satellite 8ch | Satellite 11ch | Satellite 15ch | Satellite 20ch | IMES 180ch |
| Indoor/Outdoor | Satellite 8ch | Satellite 11ch | IMES 175ch | IMES 179ch | IMES 180ch |
| Indoor | Satellite 8ch | IMES 174ch | IMES 175ch | IMES 179ch | IMES 180ch |

POSITIONAL INFORMATION TRANSMITTER, COMMUNICATION TERMINAL, AND POSITIONING SYSTEM USING POSITION DATA

CROSS-REFERENCE TO RELATED PATENT APPLICATIONS

This application is a US national phase of PCT application PCT/JP2010/061817 filed Jul. 13, 2010 which claims priority from Japan Priority Application 2009-221765, filed Sep. 28, 2009. All of the aforesaid applications are incorporated herein by reference in their entirety as if fully set forth herein.

TECHNICAL FIELD

The present invention relates to a positional information transmitter, a communication terminal, and a positioning system and, particularly, to a technology that enables acquisition of the current position of the communication terminal in an indoor area and the like where electric waves from artificial satellites are not able to be captured.

BACKGROUND ART

A positioning system utilizing radio signals transmitted from artificial satellites such as GPS (Global Positioning System) satellites (hereinafter, referred to as "satellite positioning signals") has a problem that the positioning accuracy deteriorates or positioning becomes impossible when a communication terminal such as a GPS receiver enters an area where the satellite positioning signals are not able to be received such as an indoor area, and an underground mall.

As a measure to solve this problem, for example, Patent document 1 discloses a technology of providing a positional information transmitter (indoor transmitter) transmitting positional information indicative of a position (hereinafter referred to as the "positional information signal"), using a signal compatible with one of signals having frequencies (for example, center frequency: 1.57542 GHz), a signal according to the modulation mode (specifically, BPSK (Binary Phase-Shift Keying), a signal according to the multiple access mode (specifically, CDMA (Code Division Multiple Access) in the Direct Sequence Spread Spectrum mode), etc., used in the GPS, to an area where the satellite positioning signals are not able to be received such as an indoor area or an underground mall and allowing a communication terminal such as a portable telephone to acquire the own current position from the received positional information signal. Further, Patent Document 2 and Non-Patent Document 1 disclose a technology of reducing the time required for acquiring the positional information.

In positioning with the positional information signal as described above, unlike positioning with the satellite positioning signal, the communication terminal determines that the position contained in a received positional information signal is the current own position without performing complicated positioning calculation. Accordingly, it is necessary that the positional information transmitters are arranged at intervals commensurate with the required positioning accuracy and the outputs are adjusted so that the positional information signals are not detected in areas remote from the place where they are transmitted. For example, when the positional information transmitters are arranged at intervals of 10 m, the outputs are adjusted so that the positional information signals are detected in a radius ranging from 10 m-15 m. Depending on the transmitter's sensitivity or the like, however, the signals are detected in a greater radius in some cases.

As described above, in positioning with the positional information signal, a plurality of positional information transmitters are disposed adjacently to each other. To avoid interference of the positional information signals with each other, it is desirable that the adjacent positional information transmitters do not use the same PRN (Pseudo Random Noise) number for selecting a code pattern in spread spectrum. The number of PRN numbers that are available indoors, however, is limited to about ten (10).

Patent Document 1: Japanese Patent Laid-Open Publication No. 2007-278756
Patent Document 2: Japanese Patent Laid-Open Publication No. 2009-133731
Non-Patent document 1: User Interface Specification for Quasi-zenith Satellite System (IS-QZSS) V1.0 Annex Terrestrial Complementary Signal (IMES)

DISCLOSURE OF THE INVENTION

Problems the Invention is to Solve

In the mean time, for example, when the positional information signal is transmitted from the positional information transmitter disposed at the ceiling in an indoor area or an underground mall and received by a portable communication terminal held at about the height of the human chest, there are formed null points where the received signal is extremely weak by the effect of reflected waves from the floor surface or the like.

FIG. 2 shows one example of a graph representing the relationship between the distance from the place where the signal is transmitted and the electric power of the received signal, the graph obtained by assuming that the electric wave of the positional information signal (1.57542 GHz band) that is compatible with the GPS satellite positioning signal is transmitted from one point at the ceiling and fully reflected by the floor surface. The abscissa represents the distance (m) from the place where the signal is transmitted and the ordinate represents the electric power of the received signal (dBm). The graph in FIG. 2 is obtained by calculation assuming that the transmission power is −65 dBm, the height of the place where the signal is transmitted is 3 m, and the height of the receiver is 1 m.

As seen from the graph in FIG. 2, the electric power of the received signal becomes smaller as the distance from the place where the signal is transmitted becomes greater. There are null points with relatively large widths at about 15 m, at about 10 m, and at about 7 m. For example, assuming that the electric power of the received signal necessary for communication terminals to properly receive the signal is −130 dBm, the null points have widths of a little more than 1 m at about 15 m, about 30 cm at about 10 m, and about 10 cm at about 7 m. Practically, however, the null point changes its location and width depending on the object for the signal to be reflected on and in some cases, the signal is increased in intensity by the effect of reflected waves.

As described above, the conventional art has the problem that the signal may be received not from a nearer positional information transmitter but from a more distant positional information transmitter due to the effect of the null point, resulting in an increased positioning error.

Further, if the positional information transmitters are arranged at a higher density (at intervals of 5 m, for example) to increase the positioning accuracy, a signal from a nearest positional information transmitter may interfere with one from another positional information transmitter that uses the same PRN number, causing the problem that the positional information signal from the nearest positional information transmitter is prevented from being received. If there are sufficiently a large number of PRN numbers, a different PRN number can be allotted to each positional information transmitter. The number of PRN numbers that are available indoors, however, is limited to about ten on specification according to the Non-Patent document 1, making the method in the conventional art practically infeasible.

Moreover, in the vicinity of the null point and at points where signal interference occurs, the positional information signal is not captured and if it is captured, the bit error rate is so high that the positional information is unable to be acquired and the positioning time is increased.

The present invention has been made to solve the above-mentioned problems and it is an object of the present invention to provide a positioning system for acquiring the current position both indoors and outdoors wherein the positioning error and the positioning time is prevented from increasing.

Means for Solving the Problems

The above problems are solved by providing a positional information transmitter comprising: a radio transmitting part transmitting repeatedly a positional information signal from a plurality of antennas spaced apart from each other, the positional information signal compatible with a satellite positioning signal that is a radio signal for positioning transmitted from an artificial satellite, the positional information signal being a radio signal containing position data indicative of a particular position, the positional information transmitter informing a communication terminal of the particular position specified by the position data when the communication terminal receives the positional information signal, the transmitting part transmitting from each of the antennas through one of channels the positional information signal containing the same position data, the positional information signal being transmitted either simultaneously from the antennas through the channels which are different between the antennas or sequentially in a time-shifted manner from one antenna to another antenna through any one of the channels.

Effect of the Invention

In the positioning system for acquiring the current position both indoors and outdoors according to the present invention, the positioning error and the positioning time is prevented from increasing.

BRIEF DESCRIPTION OF THE DRAWINGS

FIG. 5 An example of the data configuration of a positional information table.

FIG. 6 An example of the data configuration of a positional information message transmitted from the positional information transmitter;

FIG. 11 An exemplary setting of correlators in each operation mode;

FIG. 16 An exemplary setting of correlators in each operation mode in a variation.

BEST MODES FOR CARRYING OUT THE INVENTION

In the following, embodiments for carrying out the present invention will now be described in detail with reference to the drawings.

Figure 1:
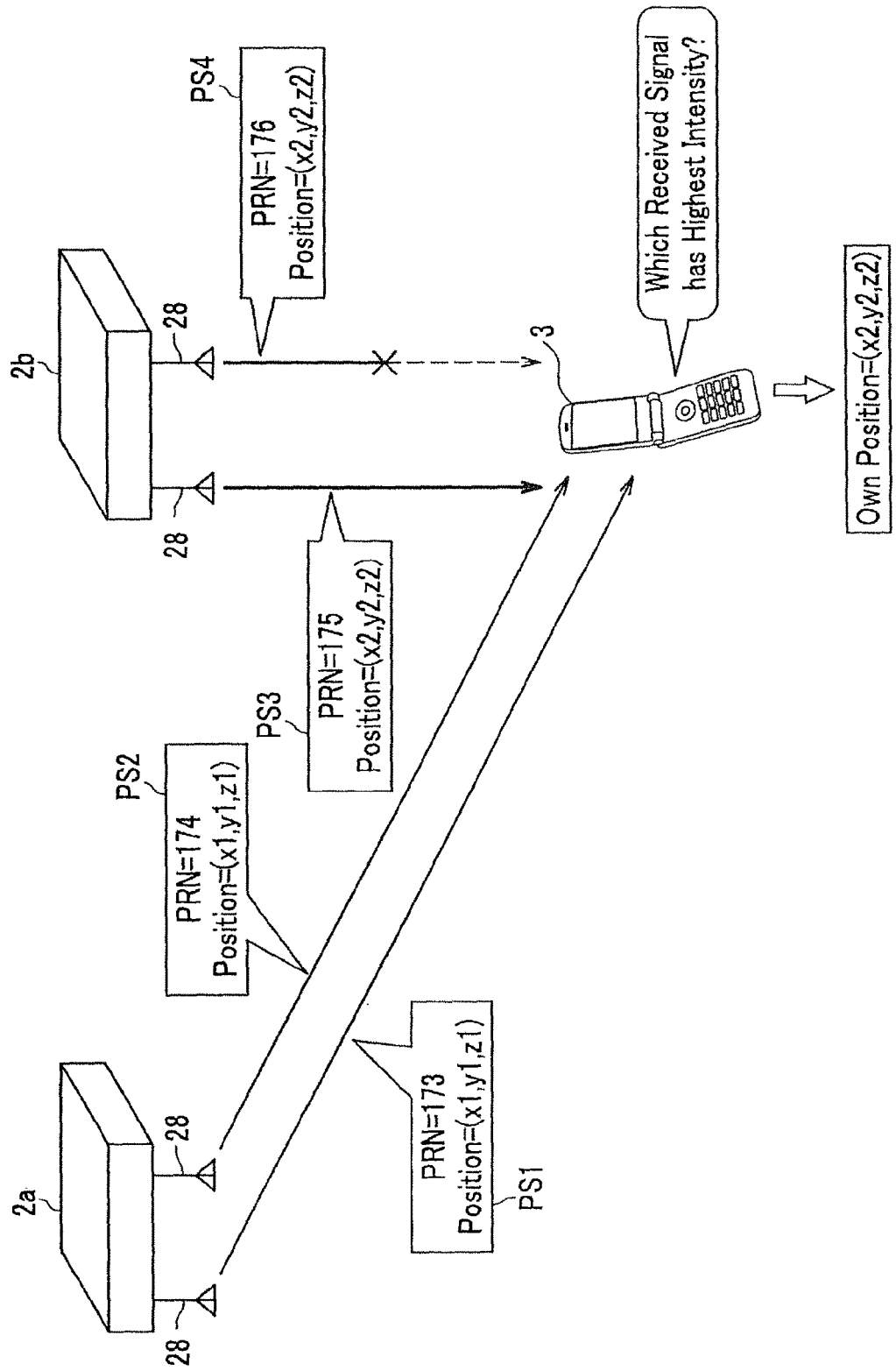
FIG. 1 An explanatory view showing the operational principle of a positional information transmitter according to the present invention.
Figure 2:
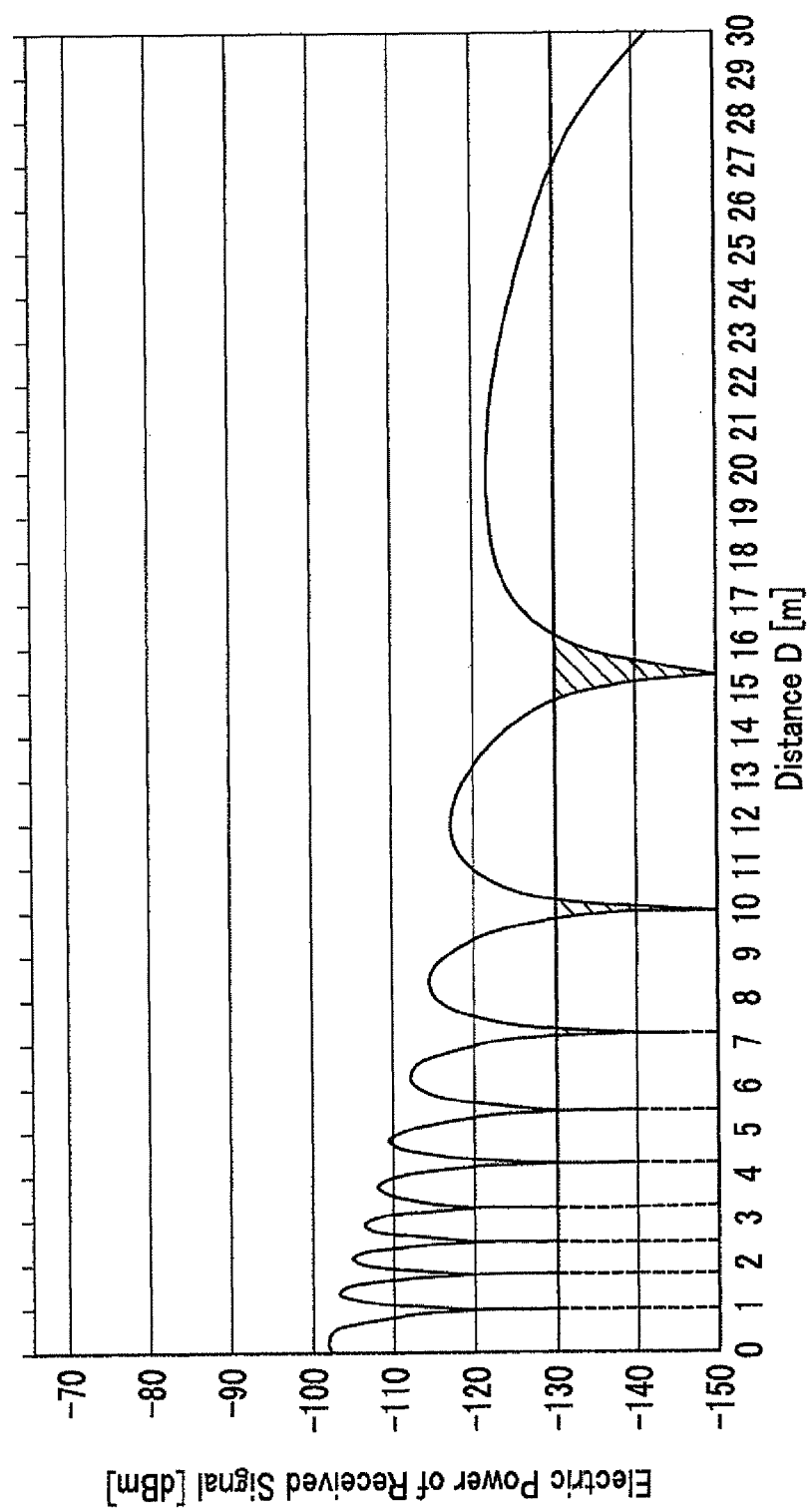
FIG. 2 One example of a graph representing the relationship between the distance from the place where the signal is transmitted and the electric power of a received signal, the graph obtained by assuming that the electric wave of a positional information signal (1.57542 GHz band) is transmitted from one point at the ceiling and fully reflected by the floor surface.

FIG. 1 is an explanatory view showing the operational principle of a positional information transmitter according to the present invention. A plurality of positional information transmitters 2 are arranged at intervals commensurate with the required positioning accuracy on the surface of a ceiling in an indoor area or the like where the satellite positioning signals are not able to be received. Each positional information transmitter 2 has two or more antennas 28 each of which transmits a positional information signal that is compatible with the satellite positioning signal and that includes positional data indicative of disposition position of the positional information transmitter 2.

Position information signals PS1, PS2, PS3 and PS4 transmitted from the antennas 28 of positional information transmitters 2a and 2b arranged adjacently to each other are subjected to spread spectrum processing with code patterns each having a different PRN number, modulated into carrier waves in predetermined frequency bands, and transmitted. For example, from the two antennas 28 of the positional information transmitter 2a, there are transmitted the two positional information signals PS1 and PS2 that are subjected to spread spectrum processing (encoded) with code patterns having PRN numbers 173 and 174, respectively and that contain the same positional data (x1, y1, z1) which represent the longitude, the latitude and the altitude. Likewise, from the two antennas 28 of the positional information transmitter 2b, there are transmitted the two positional information signals PS3 and PS4 that are encoded with PRN numbers 175 and 176 and that contain the same positional data (x2, y2, z2).

These transmitted positional information signals that are encoded with the different PRN numbers, i.e., different code patters, from each other, do not interfere with each other. Accordingly, if the communication terminal 3 is in the propagation ranges of electric waves from the positional information transmitters 2a and 2b, the communication terminal 3 receives all of the four positional information signals PS1, PS2, PS3 and PS4 if the above-mentioned effect of the null point is absent.

Basically, as the communication terminal 3 is located nearer to the place where the signal is transmitted, the signal received has a higher intensity. The communication terminal 3 selects only one signal to be received that has the highest intensity among all of the positional information signals and defines the own position as (x2, y2, z2) based on the positional data contained in the selected positional information signal.

Here, even if the communication terminal 3 is not capable of receiving the positional information signal PS4 due to the effect of a null point as shown by the mark "x" in FIG. 1, the communication terminal 3 is capable of receiving the positional information signal PS3 transmitted from the other antenna 28 that is spaced apart by a distance more than the width of the null point, the positional information signal PS3 having an intensity higher than those of the other positional information signals PS1 and PS2 when received. Accordingly, the communication terminal 3 defines the own position as (x2, y2, z2).

To avoid the effect of null points, the positional information transmitter 2 more preferably comprises three or more rather than two antennas 28. Further, if the positional information transmitter 2 comprises three or more antennas 28, those antennas 28 may be arranged to share a common plane in the form of, for example, a triangle or a cross as well as in a line.

Figure 3:
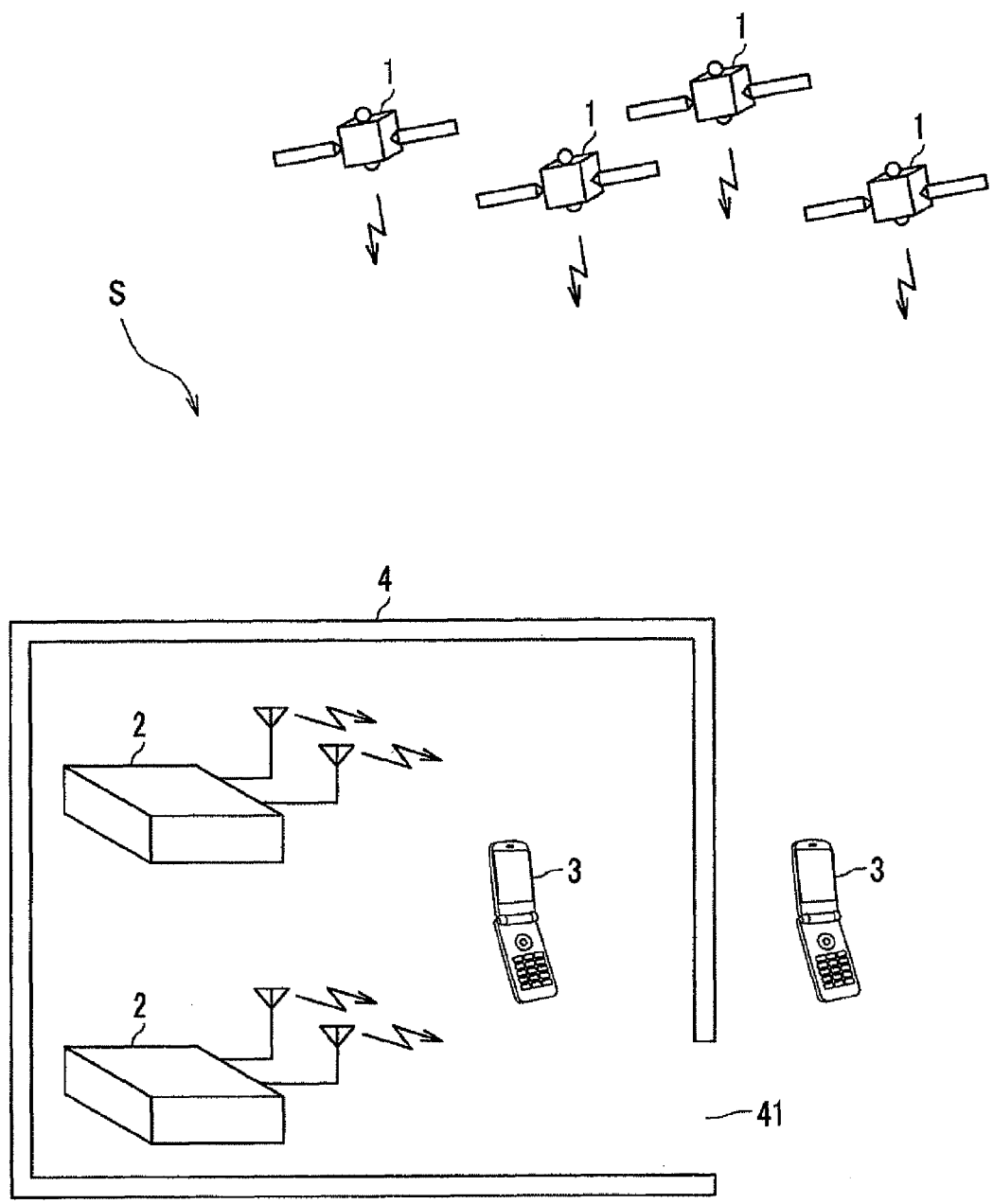
FIG. 3 A schematic view of a positioning system including the positional information transmitters according to the present invention.

FIG. 3 is a schematic view of a positioning system including the positional information transmitters according to the present invention. As shown in FIG. 3, the positioning system S includes a plurality of artificial satellites 1, a plurality of positional information transmitters 2, a plurality of communication terminals 3, and a construction 4 where satellite positioning signals are difficult to receive such as a building or an underground mall. The artificial satellite 1 transmits a radio signal for positioning (satellite positioning signal) to the earth. The positional information transmitter 2 transmits a positional information signal that is a positioning signal containing positional data on one point on the earth (including an indoor area, an underground mall, etc.). The communication terminal 3 acquires the own current position based on the positioning signal either from the artificial satellite 1 or from the positional information transmitter 2.

The artificial satellites 1 are, for example, artificial satellites in positioning systems such as GPS, Galileo positioning system (Galileo Positioning System), GLONASS (Global Navigation Satellite System) and Quazi-Zenith Satellites. It is assumed that the artificial satellites 1 are GPS satellites and that the satellite positioning signals transmitted from the artificial satellites 1 are GPS signals such as L1 signals (1575.42 MHz) or L2 Signals (1227.6 MHz) in the following description.

The satellite positioning signals sent from the artificial satellites 1 include so-called navigation messages. A navigation message includes a total of 25 frames, for example, and each frame includes five sub-frames and each sub-frame is made up of ten words. A word is made up of 30 bits. Each sub-frame includes correction information of a satellite clock, precise orbit information (ephemeris), general orbit information (almanac), ionosphere correction information, UTC (Coordinated Universal Time) correction information, and health information of artificial satellites, for example.

These navigation messages are subjected to spread spectrum processing with a code pattern uniquely allotted to each artificial satellite 1 into a Pseudo Random Noise Code, which is then BPSK-modulated into a carrier wave in a predetermined frequency band. The numbers allotted to individual code patterns for generating the Pseudo Random Noise Codes are called PRN numbers. Each of the artificial satellites 1 is given a different PRN number and the PRN number is also used as the number for identifying the artificial satellite and for identifying the transmission channel for the positioning signal. That is, a plurality of independent channels are constituted through the spread spectrum.

The positional information signals transmitted from the positional information transmitters 2 are compatible with the satellite positioning signals transmitted from the artificial satellites 1 to the earth and are transmitted as radio signals having the modulation mode and the frame configuration same as the satellite positioning signals. However, despite that a large number of the positional information transmitters 2 are arranged in the same area, there are only about ten PRN numbers at maximum that they can use. This means that the same PRN number should be shared by a plurality of the positional information transmitters 2 unless the positional information signals from the plurality of positional information transmitters 2 interfere with each other.

The communication terminal 3 is a portable communication terminal positioning the own current position by receiving the positioning signals from the artificial satellite 1 or the positional information transmitter 2, such as a GPS portable telephone or a PND (Personal Navigation Device).

First Embodiment

Figure 4:
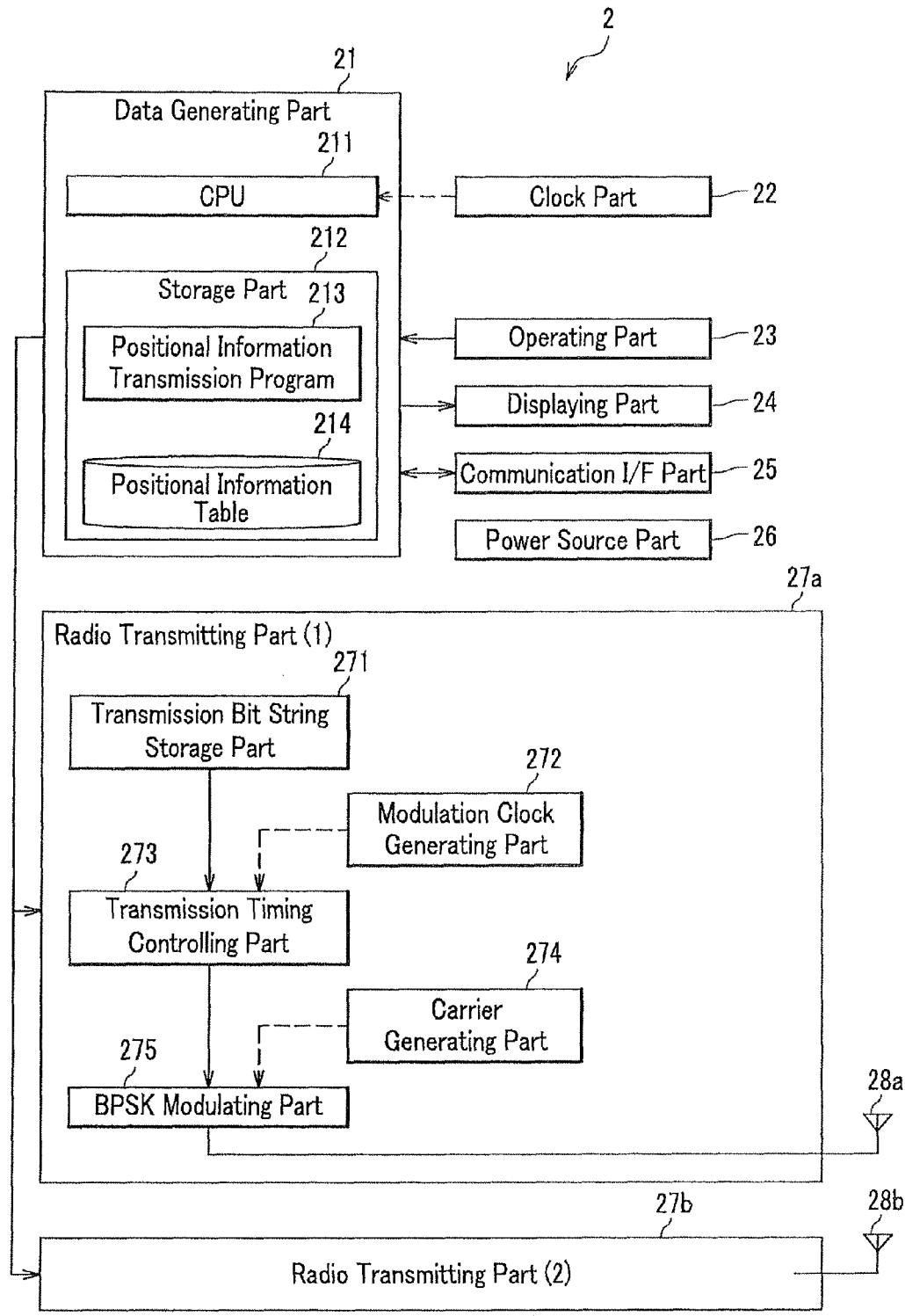
FIG. 4 A functional block diagram showing the positional information transmitter according to a first embodiment of the present invention.

FIG. 4 is a functional block diagram showing an example of the configuration of the positional information transmitter according to a first embodiment of the present invention.

As shown in FIG. 4, the positional information transmitter 2 includes a data generating part 21, a clock part 22, an operating part 23, a displaying part 24, a communication I/F (Interface) part 25, a power source part 26, a radio transmitting part (1) 27a, a radio transmitting part (2) 27b, and two antennas 28a and 28b.

The clock part 22 is an oscillator such as a TCXO (temperature compensated crystal oscillator) or a OCXO (oven-controlled crystal oscillator), for example, and generates a clock signal (e.g., 20 MHz) for operating the data generating part 21. The operating part 23 is a user interface for performing an input operation to the positional information transmitter 2 and includes operation buttons and switches, for example. The displaying part 24 is a user interface for displaying various pieces of information necessary for an input operation to the positional information transmitter 2 and for checking the operation state of the positional information transmitter 2. The displaying part 24 is a liquid crystal monitor or an LED (Light Emitting Diode), for example.

The communication I/F part 25 is a communication interface for connecting the positional information transmitter 2 to an external apparatus such as another computer (information processing apparatus). The communication I/F part 25 is RS-232C, UART (Universal Asynchronous Receiver Transmitter), open collector, TTL (Transistor-Transistor Logic), parallel I/F, USB (Universal Serial Bus), IEEE802.15.4, and BLUETOOTH radio, for example. A computer, not shown, connected to the positional information transmitter 2 through the communication I/F part 25 registers data to or maintains a positional information table 214. The power source part 26 supplies drive power to the parts of the positional information transmitter 2.

The data generating part 21 includes a CPU 211 and a storage part 212. The storage part 212 stores a positional information transmission program 213 and the positional information table 214. The positional information transmission program 213 is a program which implements a positional information transmission function by being loaded into a memory and executed by the CPU 211.

FIG. 5 shows an example of the data configuration of the positional information table 214. As shown in FIG. 5, the positional information table 214 includes a boundary flag 501, a PRN number (1) 502, a PRN number (2) 503, a latitude 504, a longitude 505, and an altitude 506 registered thereon.

The boundary flag 501 is set to "1: on" or "0: off". The boundary flag 501 is information (boundary area information) indicative of the positional information transmitter 2 being disposed near the boundary between outdoor and indoor. The boundary flag 501 is used for setting which of the satellite positioning signal or the positional information signal is received by each of the correlators (operation mode) of the communication terminal 3. A value of the boundary flag 501 is set to "1: on" in the positional information transmitter 2 disposed near a doorway 41 of the construction 4 of FIG. 3 and the boundary flags 311 are set to "0: off" in the positional information transmitters 2 in the construction 4, for example.

The PRN number (1) 502 and the PRN number (2) 503 are set to PRN numbers that are allotted respectively to the radio transmitting part (1) 27a and the radio transmitting part (2) 27b. The PRN numbers also correspond to transmission channel numbers. For example, an IMES (Indoor MEssaging System) described in the Non-Patent document 1 is capable of using ten numbers (channels) of from 173 through 182, among which two numbers (for example, 173 and 174) are selected so that the signals to be sent through these channels do not interfere with signals transmitted from other adjacently arranged positional information transmitters 2.

The latitude 504, the longitude 505 and the altitude 506 are set to the latitude (for example, north latitude 35.1234 degrees), the longitude (for example, east longitude 139.3456 degrees) and the altitude (for example, 30 m) that constitute the positional data transmitted by the positional information transmitter 2.

By executing the positional information transmission program 213, the data generating part 21 implements the positional information transmission function to generate a positional information message to be transmitted from the positional information transmitter 2 based on the boundary flag 501, the latitude 504, the longitude 505 and the altitude 506 all registered in the positional information table 214; converts the generated positional information message into the frame configuration of the navigation message; generates two types of transmission bit strings through the spread spectrum with the code patterns set in the PRN number (1) 502 and the PRN number (2) 503 that correspond to the radio transmitting parts respectively; and inputs the generated two types of bit strings into respective transmission bit string storage parts 271 of the radio transmitting part (1) 27a and the radio transmitting part (2) 27b.

FIG. 6 is an example of the data configuration of the positional information message transmitted from the positional information transmitter 2. As shown in FIG. 6, a positional information message 215 is made up of a boundary flag 601 serving as boundary area information, a latitude 602, a longitude 603 and an altitude 604 which serve as positional data.

These pieces of information or data are generated by reading out the corresponding pieces of data from the positional information table 214. In the following description, the entire data of the positional information message 215 is referred to as the "positional information."

The radio transmitting part (1) 27a and the radio transmitting part (2) 27b are of a similar function and configuration, and thus one of them, the radio transmitting part (1) 27a, will be described in the following. The radio transmitting part (1) 27a includes the transmission bit string storage part 271, a modulation clock generating part 272, a transmission timing controlling part 273, a carrier generating part 274, and a BPSK modulating part 275.

The transmission bit string storage part 271 stores the transmission bit string generated by the data generating part 21. The modulation clock generating part 272 include an oscillator such as TCXO (temperature compensated crystal oscillator) and OCXO (oven-controlled crystal oscillator), for example, and generates a clock signal (for example, 1.023 MHz±0.1 ppm or below) for allowing the transmission timing controlling part 273 to read out the transmission bit string stored in the transmission bit string storage part 271. The transmission timing controlling part 273 reads out the transmission bit string stored in the transmission bit string storage part 271 bit-by-bit in synchronization with the clock signal and thereby inputs a transmission bit stream signal into the BPSK modulating part 275. The carrier generating part 274 includes an oscillator such as TCXO (temperature compensated crystal oscillator) and OCXO (oven-controlled crystal oscillator), for example, and a PLL (Phase Locked Loop) synthesizer and generates a carrier wave in a predetermined frequency band that is used for satellite positioning signals (having a center frequency of 1575.42 MHz, for example). The BPSK modulating part 275 BPSK-modulates the carrier wave to change the phase of the carrier wave in response to the transmission bit stream signal input from the transmission timing controlling part 273, and outputs the BPSK-modulated signal to the antennas 28a.

Figure 7:
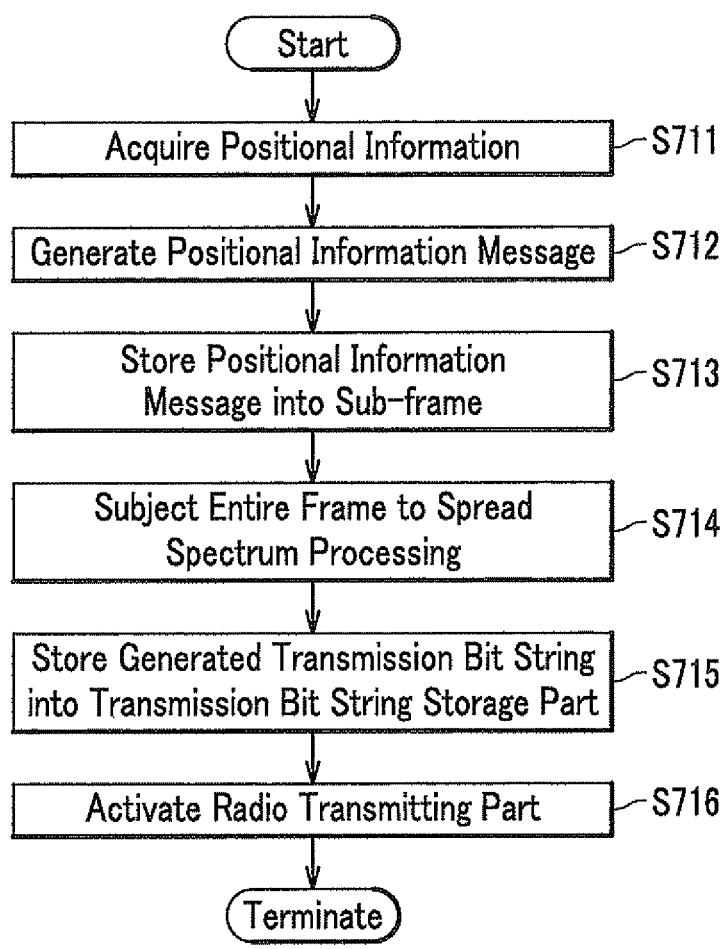
FIG. 7 A process flowchart of a positional information transmission program.

FIG. 7 is a process flowchart of the positional information transmission program 213 implemented by the data generating part 21. The letter "S" added to the beginning of reference numerals stands for a step in the following description.

As shown in FIG. 7, the data generating part 21 acquires positional information to be included in the positional information signal from the positional information table 214 (S711). The data generating part 21 generates a positional information message including the acquired positional information (S712) and stores the generated positional information message into sub-frames (S713).

The data generating part 21 generates transmission bit strings by subjecting the navigation message made up of the sub-frames storing the positional information message, to spread spectrum processing with the code patterns that respectively correspond to the PRN numbers registered in the positional information table 214 (S714) and stores the generated transmission bit strings in the transmission bit string storage part 271 of the radio transmitting parts 27 allotted to the respective transmission bit strings (S715), and starts up the radio transmitting parts 27.

The radio transmitting parts 27 repeatedly transmit at a predetermined cycle the positional information signals that are encoded with different PRN numbers and that contain the same positional information, from the corresponding antennas 28, using the carrier waves having phases modulated in response to the transmission bit stream signals that are generated from the transmission bit strings stored in the transmission bit string storage parts 271. The communication terminal 3 receives any one of the positional information signals transmitted from the plurality of antennas 28. As a result, the problem that the positional information is unable to be received from the effect of the null point can be solved substantially.

Second Embodiment

Figure 8:
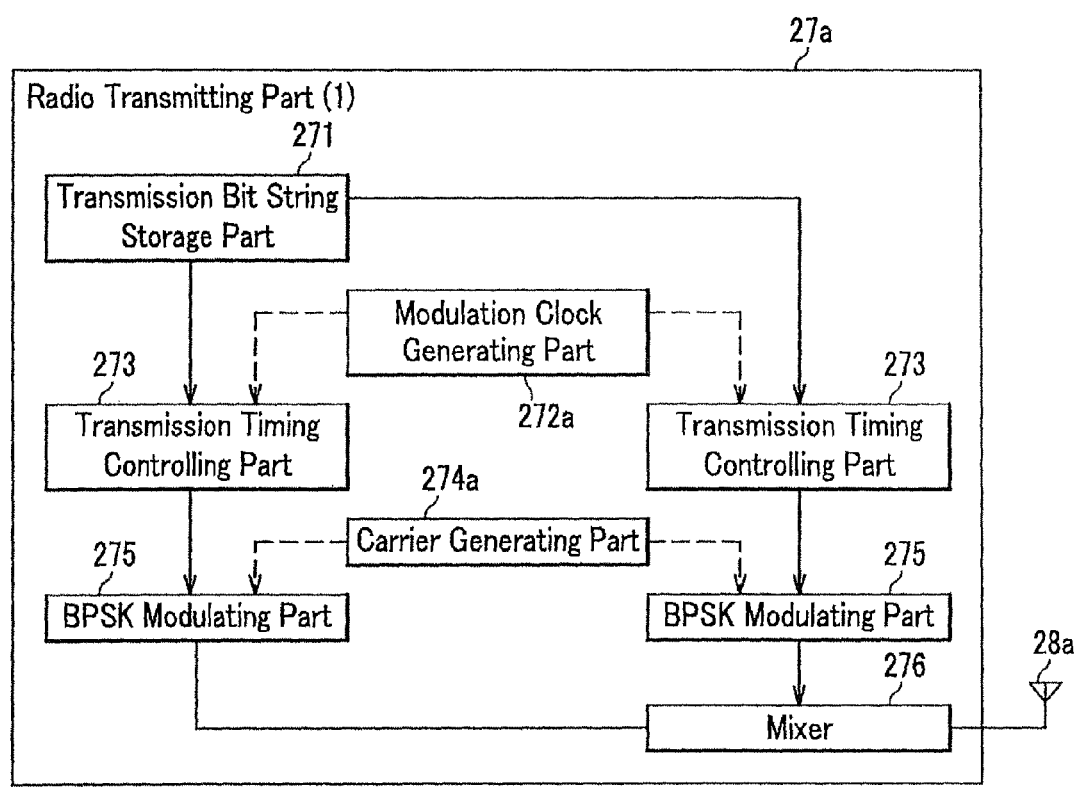
FIG. 8 A functional block diagram showing an example of the configuration of a radio transmitting part according to a second embodiment of the present invention.

FIG. 8 is a functional block diagram showing an example of the configuration of a radio transmitting part of the positional information transmitter according to a second embodiment of the present invention. The positional information transmitter according to the second embodiment is the same as the positional information transmitter according to the first embodiment in function and configuration, except that the positional information transmitter according to the second embodiment has the radio transmitting part 27a shown in FIG. 8, and descriptions on the same parts will be omitted.

As shown in FIG. 8, the radio transmitting part (1) 27a includes a transmission bit string storage part 271, a modulation clock generating part 272a, two transmission timing controlling parts 273, a carrier generating part 274a, two BPSK modulating parts 275, and a mixer 276. That is, in this embodiment, the transmission timing controlling part 273 and the BPSK modulating part 275 according to the first embodiment (See FIG. 4) are each increased to two in number so that the radio transmitting part (1) 27a has two systems each including one transmission timing controlling part 273 and one BPSK modulating part 275, and signals generated through the respective systems are mixed by the mixer 276.

The modulation clock generating part 272a according to the second embodiment includes an oscillator such as TCXO (temperature compensated crystal oscillator) and OCXO (oven-controlled crystal oscillator), for example, and generates two clock signals (for example, 1.023 MHz+0.1 ppm and 1.023 MHz−0.1 ppm) in the same frequency band that prescribe sampling periods for the two transmission timing controlling parts 273 to read out the transmission bit strings stored in the transmission bit string storage parts 271. The two transmission timing controlling parts 273 read out the transmission bit strings respectively stored in the transmission bit string storage parts 271 bit-by-bit in synchronization with the two clock signals and thereby input into the two BPSK modulating parts 275 two transmission bit stream signals that have slightly different data transfer rates in a predetermined range of data transfer rates.

The carrier generating part 274a generates two carrier waves (for example, 1575.42 MHz+0.2 ppm and 1575.42 MHz−0.2 ppm) in a predetermined frequency band to be used for two satellite positioning signals. The two BPSK modulating parts 275 BPSK-modulate the two carrier waves to change the phases of the two carrier waves in response to the transmission bit stream signals input from the transmission timing controlling parts 273 and input the BPSK-modulated signals into the mixer 276. The mixer 276 mixes the two BPSK-modulated signals input from the two BPSK modulating parts 275 and outputs the resulting signals to the antennas 28a.

With the radio transmitting parts 27 according to the second embodiment, since the carrier waves are modulated with the transmission bit stream signals synchronized to the two different clock signals, if the receiver is capable of separating the two signals forming a carrier wave from each other, the time required for searching the frequencies of the transmission bit stream signals to be received is able to be shortened to about one seconds. Further, since the positional information signals containing the same positional information that are encoded with the same PRN number is able to be transmitted simultaneously from the two different antennas 28, the total number of PRN numbers capable of being used by the positional information transmitter 2 can be increased substantially to about 20, which is twice the total number of PRN numbers conventionally used.

Further, with the radio transmitting parts 27 according to the second embodiment, since the positional information signals are transmitted with the two carrier waves having different frequencies, if the receiver is capable of separating the two signals forming a carrier wave from each other, the time required for searching the frequencies of the carrier waves is able to be shortened to about one seconds. Further, if the two carrier waves are used in combination with the two clock signals, the total number of PRN numbers capable of being used by the positional information transmitter 2 is increased substantially to about 40, which is four times the total number of PRN numbers conventionally used. This allows the positional information transmitters 2 arranged adjacently to each other to transmit the positional information signals without using the same channel, preventing an increase in positioning error and positioning time due to signal interferences.

Subsequently, description will be made of the detail of the communication terminal 3 positioning the own current position by receiving the positional information signal transmitted from the positional information transmitter 2 according to the present invention.

Figure 9:
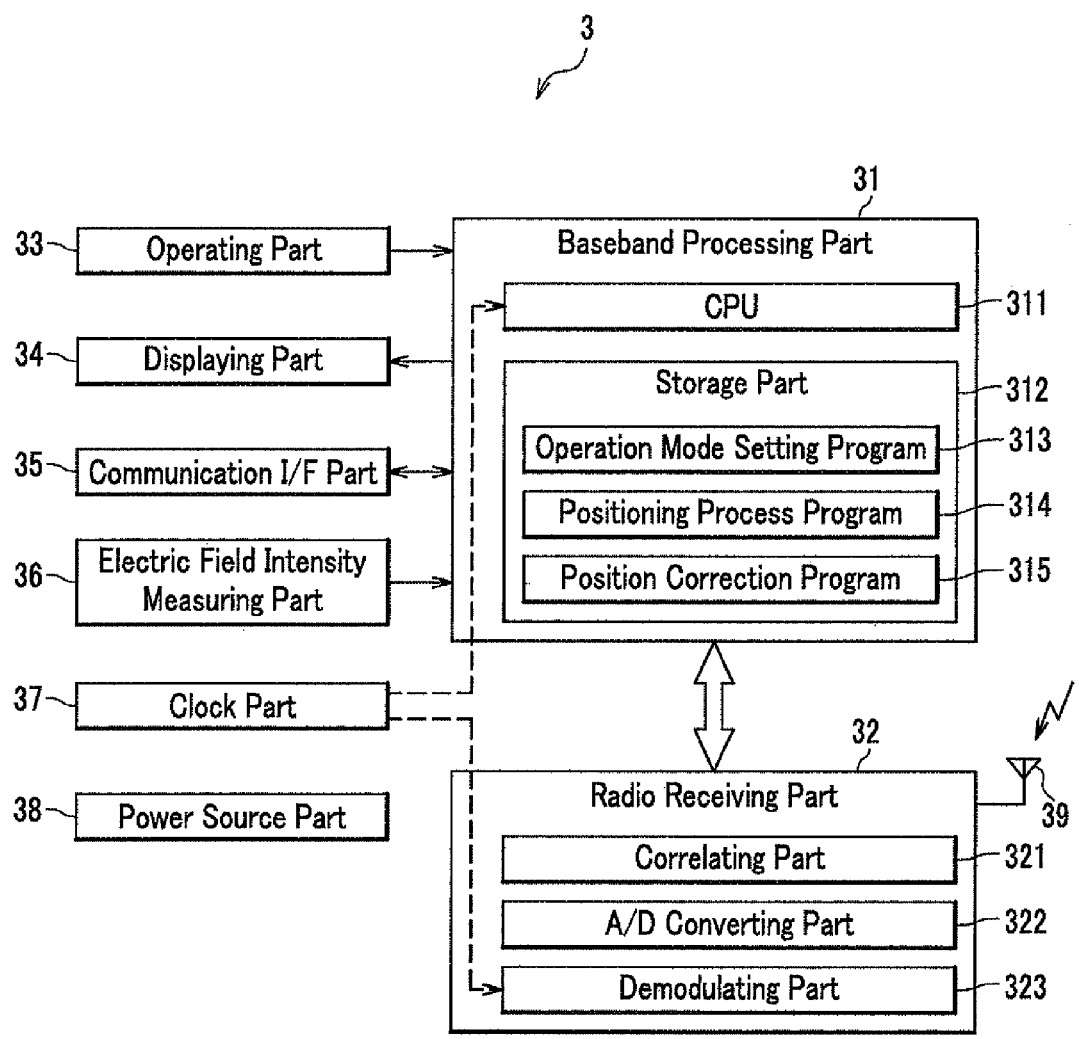
FIG. 9 A functional block diagram of a communication terminal positioning by receiving the positional information signal.

FIG. 9 is a functional block diagram of the communication terminal positioning by receiving the positional information signal transmitted from the positional information transmitter according to the present invention. As shown in FIG. 9, the communication terminal 3 includes a baseband processing part 31, a radio receiving part 32, an operating part 33, a displaying part 34, a communication I/F part 35, an electric field intensity measuring part 36, a clock part 37, and a power source part 38. The communication terminal 3 is a GPS receiving apparatus or a portable communication terminal such as a portable telephone equipped with a GPS positioning function, for example.

The baseband processing part 31 includes a CPU 311 and a storage part 312. The CPU 311 loads various programs stored in the storage part 312 into a memory, not shown, and executes them to implement various functions of the communication terminal 3.

The storage part 312 is, for example, a RAM (Random Access Memory), a ROM (Read Only Memory), and a non-volatile memory such as a flash memory. The storage part 312 stores an operation mode setting program 313 causing the baseband processing part 31 to implement an operation mode setting function of setting an operation mode of the communication terminal 3, a positioning process program 314 causing the baseband processing part 31 to implement a positioning process function of acquiring the current position of the own device, and a position correction program 315 causing the baseband processing part 31 to implement a correction process function of correcting the current position of the own device.

The radio receiving part 32 includes a correlating part 321, an A/D converting part 322, a demodulating part 323, and an antenna 39.

The demodulating part 323 generates a signal (hereinafter, a reception signal) by demodulating (BPSK-demodulating) the analog signal of the carrier wave captured by the antenna 39 with a clock signal input from the clock part 37 and inputs the generated reception signal to the A/D converting part 322.

The A/D converting part 322 converts the reception signal input from the demodulating part 323 into a digital signal (reception bit stream signal).

the correlating part 321 includes a plurality of correlators, not shown, capable of concurrent operation (capable of tracking a plurality of channels corresponding to different PRN numbers). The channels, that is, the PRN numbers to be demodulated may independently and respectively be set in the correlators. Each of the correlators decodes the reception bit stream signal input from the A/D converting part 322 by a replica pattern (code pattern for decoding generated from the PRN number) and inputs a digital data decoded from the reception bit stream signal to the baseband processing part 31.

the clock part 37 generates a clock signal (e.g., 24 MHz) for operating the CPU 311 and a clock signal (e.g., 1.023 MHz) necessary for the demodulation by the demodulating part 323. The clock part 37 includes an oscillator such as TCXO (temperature compensated crystal oscillator) and OCXO (oven-controlled crystal oscillator), for example, and a PLL synthesizer.

The operating part 33 is a user interface for performing input operation to the communication terminal 3 and includes operation buttons, an operation dial, etc. The displaying part 34 is an interface that displays various pieces of information and is a liquid crystal monitor, an organic EL panel, etc. The communication I/F part 35 is a communication interface for connecting the communication terminal 3 to an external apparatus. The communication I/F part 35 is an RS-232C, UART, an open collector, TTL, a parallel I/F, a USB, etc.

The electric field intensity measuring part 36 is made up of an RSSI (Received Signal Strength Indicator) circuit, for example, or an SNR (signal-noise ratio) circuit and inputs a signal indicative of the electric field intensity of received radio signals to the baseband processing part 31. The power source part 38 supplies drive power to the parts of the communication terminal 3.

Figure 10:
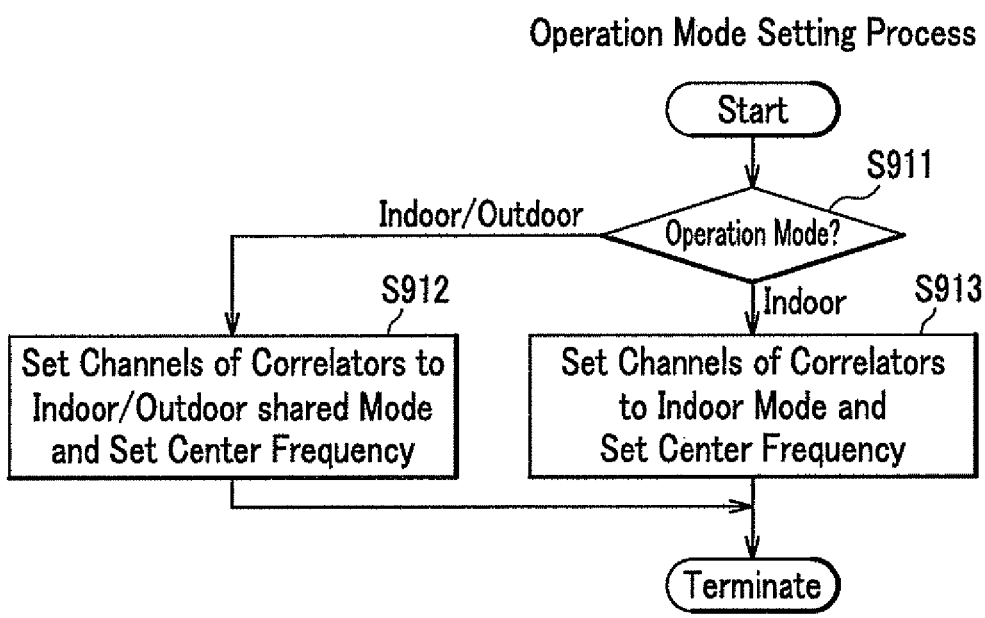
FIG. 10 A process flowchart of an operation mode setting program.

FIG. 10 is a process flowchart of the operation mode setting program 313 executed by the baseband processing part 31. The process shown in FIG. 10 is automatically or manually started, for example, when the communication terminal 3 is turned on or when a user performs a predetermined setting operation.

As shown in FIG. 10, first, the baseband processing part 31 acquires the operation mode currently set in the communication terminal 3 from a non-volatile memory, not shown, of the communication terminal 3 and determines the acquired operation mode (S911). Next, the baseband processing part 31 sets channels (PRN numbers of the correlators) for the radio signals (satellite positioning signal or positional information signal) captured by the correlators of the correlating part 321 and the center frequency depending on the acquired operation mode (S912 and S913). The center frequency is 1575.42 MHz in the case of the L1 signal, for example. The center frequency is not necessarily matched completely to this frequency and may be set to a slightly mismatched frequency (for example, 1575.42 MHz+5.2 ppm and 1575.42 MHz−5.2 ppm).

FIG. 11 depicts an exemplary setting of the correlators when five correlators exist. As shown in FIG. 11, if the operation mode is set to "indoor/outdoor" (S911: indoor/outdoor), the baseband processing part 31 sets four correlators (1 to 4) to channels (8 ch, 11 ch, 15 ch, and 20 ch) for the satellite positioning signal and another correlator (5) to a channel (180 ch) for the positional information signal of the IMES.

If the operation mode is set to "indoor" (S911: indoor), the baseband processing part 31 sets only one correlator (1) to a channel (8 ch) for the satellite positioning signal and four other correlators (2 to 5) to channels (174 ch, 175 ch, 179 ch, and 180 ch) for the positional information signal of the IMES.

In either operation mode, at least one correlator (the correlator (5) in FIG. 11) is set to a certain channel (180 ch) for the positional information signal. This is for the purpose of enabling the communication terminal 3 to automatically set an operation mode when receiving positional information having a boundary flag is set to "1" as described later.

Although the case of the correlating part 321 including five correlators is described as an example, the number of correlators included in the correlating part 321 is not limited to five. For example, if the correlating part 321 includes 16 correlators, 14 correlators are set to channels for the satellite positioning signal and two other correlators are set to channels for the positional information signal if the operation mode is "indoor/outdoor" and if the operation mode is "indoor", two correlators are set to channels for the satellite positioning signal and 14 other correlators are set to channels for the positional information signal.

Figure 12:
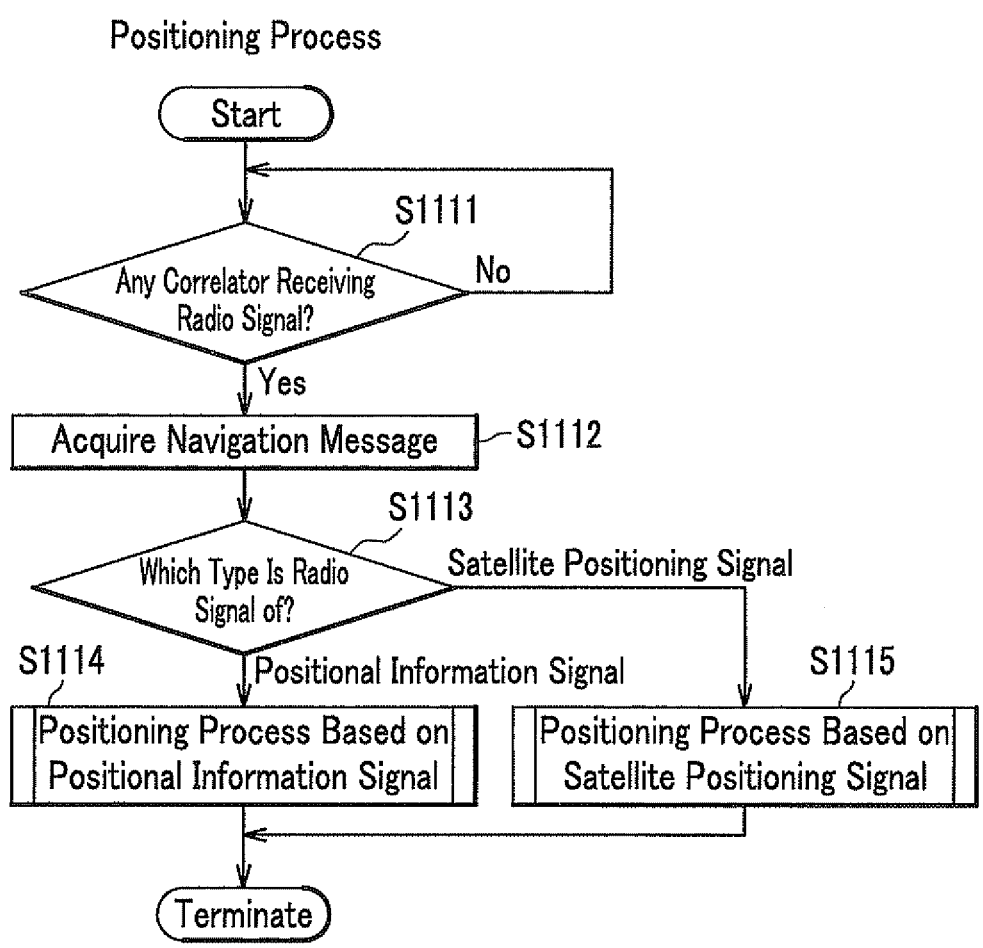
FIG. 12 A process flowchart of a positioning process program.

FIG. 12 is a process flowchart of the positioning process program 314 executed by the baseband processing part 31.

As shown in FIG. 12, the baseband processing part 31 monitors in real time whether a correlator receiving the radio signal (satellite positioning signal or positional information signal) exists based on the signal input from the radio receiving part 32 (S1111) and if a correlator receiving the radio signal exists (S1111: YES), the baseband processing part 31 acquires a navigation message included in the radio signal received by the correlator (S1112).

The baseband processing part 31 checks whether the channel set in the correlator receiving the radio signal is a channel for the artificial satellites or a channel for the positional information transmitters to determine the type of the received radio signal (S1113). If the received radio signal is the positional information signal (S1113; positional information signal), the baseband processing part 31 executes a positioning process based on the positional information signal (S1114). On the other hand, if the received radio signal is the satellite positioning signal (S1113: satellite positioning signal), the baseband processing part 31 executes a positioning process based on the satellite positioning signal (S1115).

Figure 13:
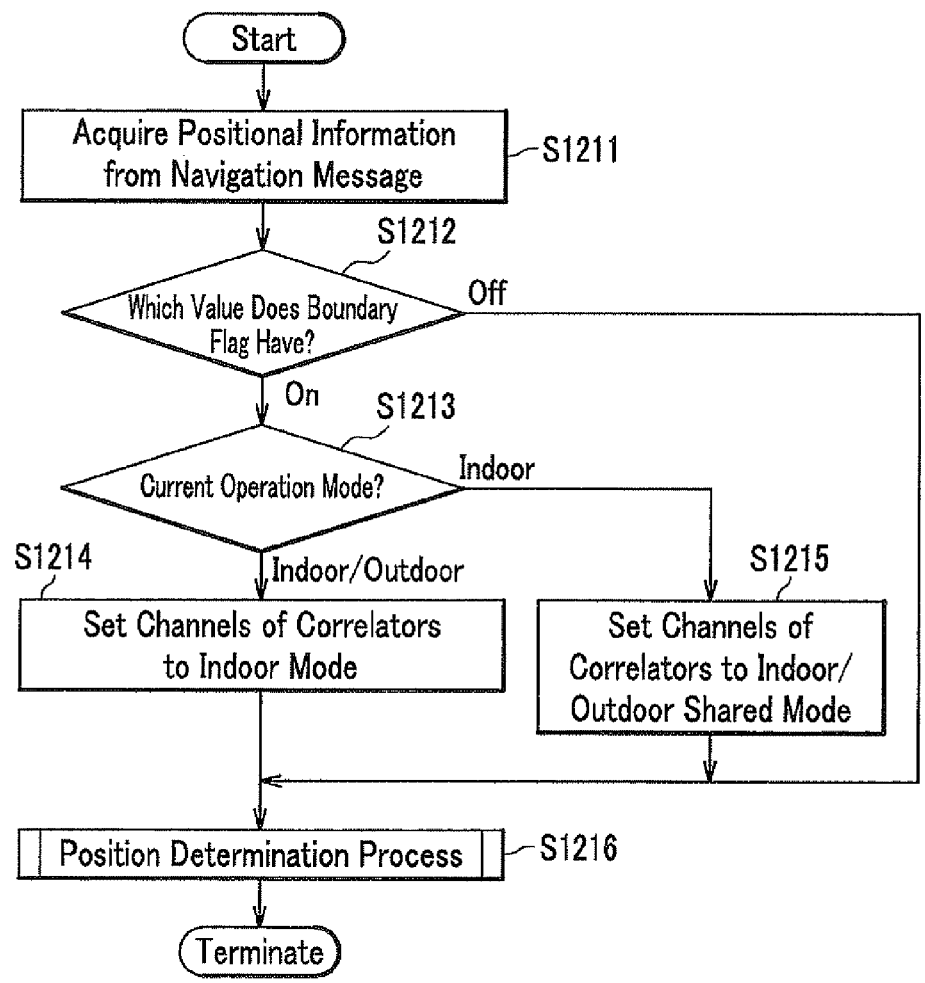
FIG. 13 A process flowchart of a positioning process based on the positional information signal.

FIG. 13 is a process flowchart of the positioning process based on the positional information signal (S1114 in FIG. 12). As shown in FIG. 13, the baseband processing part 31 acquires positional information (the boundary flag 601, the latitude 602, the longitude 603, the altitude 604) from the positional information message 215 (see FIG. 6) contained in the navigation message (S1211).

The baseband processing part 31 checks details of the acquired boundary flag 601 (S1212). If the boundary flag is "1; on" (S1212: on), the process goes to S1213. If the boundary flag is "0: off" (S1212: off), the process goes to S1216.

At S1213, the baseband processing part 31 checks the current operation mode set in the communication terminal 3. If the current operation mode is set to "indoor/outdoor shared mode" (S1213; indoor/outdoor), the baseband processing part 31 sets the operation mode of the communication terminal 3 to the "indoor mode" (S1214). On the other hand, if the current operation mode is set to "indoor mode" (S1213; indoor), the baseband processing part 31 sets the operation mode of the communication terminal 3 to the "indoor/outdoor shared mode" (S1215).

At S1216, the baseband processing part 31 executes a position determination process based on the positional information signal (S1216).

The case of the current operation mode set to "indoor/outdoor shared mode" at S1213 occurs, for example, when a user of the communication terminal 3 outside of the construction 4 comes closer to the doorway 41 of the construction 4 and receives the positional information signal of the positional information transmitter 2 disposed near the doorway 41 in FIG. 3.

The case of the current operation mode set to "indoor mode" at S1213 occurs, for example, when the operation mode is set to "indoor mode" by receiving the positional information signal having the boundary flag set to "1: on" from the positional information transmitter 2 at the time of passage through the doorway 41 because the user of the communication terminal 3 passes through the doorway 41 of the construction 4 and enters the construction 4 and the user subsequently comes closer to the doorway 41 to go out of the construction 4 and receives the positional information signal with the boundary flag set to "1: on" again from the positional information transmitter 2 disposed near the doorway 41 in FIG. 3.

As above, the operation mode of the communication terminal 3 is set to an operation mode preferable for the communication terminal 3 automatically acquiring the own current position when the communication terminal 3 receives the positional information signal with the boundary flag set to "1: on" from the positional information transmitter 2. Therefore, for example, the setting may automatically be performed in such a way that a ratio of correlators receiving the positional information signals is increased if the communication terminal 3 exists indoors and a ratio of correlators receiving the satellite positioning signals is increased if the communication terminal 3 exists outdoors. Performing the appropriate setting of the operation mode as above reduces a period when the communication terminal 3 is unable to identify the own current position and the communication terminal 3 may stably and reliably acquire the own current position.

Figure 14:
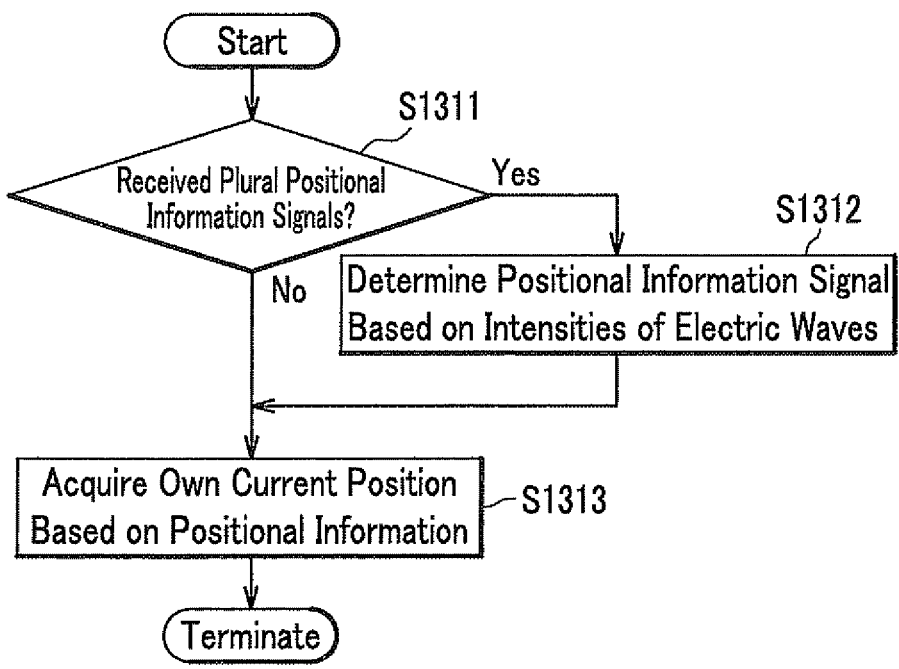
FIG. 14 A process flowchart of a position determination process based on the positional information signal.

FIG. 14 is a process flowchart of the position determination process based on the positional information signal (S1216 in FIG. 13). In the position determination process, first, the baseband processing part 31 determines whether the communication terminal 3 receives a plurality of positional information signals (S1311). The case of the communication terminal 3 receiving a plurality of positional information signals occurs, for example, when the terminal is located near the center position of the disposition positions of a plurality of the positional information transmitters 2 or when the positional information signal from the positional information transmitter 2 disposed near the communication terminal 3 is received along with the positional information signals from the positional information transmitters 2 disposed remotely from the communication terminal 3 (positional information signals may be transmitted and arrive through a wall, a floor, and a window in some cases). At S1311, if it is determined that the communication terminal 3 receives a plurality of positional information signals (S1311: YES), the process goes to step S1312. On the other hand, if it is determined that the communication terminal 3 does not receive a plurality of positional information signals (S1311: NO), the process goes to step S1313.

At S1312, the baseband processing part 31 determines the positional information signal that should be adopted for finding the own current position from the intensities of the electric waves of the plurality of the received positional information signals. For example, the baseband processing part 31 compares respective electric field intensities of the positional information signals acquired from the electric field intensity measuring part 36 to adopt the positional information signal having the highest electric field intensity. For example, the baseband processing part 31 may select the positional information signals containing the same positional information among the plurality of the positional information signals having electric field intensities higher than a certain value.

At S1313, the baseband processing part 31 finds the own current position based on the positional information contained in the received positional information signal (the positional information signal determined at S1118 if a plurality of positional information signals are received). For example, if the received positional information signal contains the positional information as shown in FIG. 6, the baseband processing part 31 defines the own current position as north latitude 35.1234 degrees, east longitude 139.3456 degrees, and altitude 30 m.

The baseband processing part 31 may execute the position correction program 315 to correct the current position based on reference sensor information contained in the positional information signal and sensor information acquired from a sensor part, not shown. For example, by detecting a difference between the atmospheric pressures of the positional information transmitter 2 and the communication terminal 3, the acquired altitude is corrected based on a relational expression of the atmospheric pressure and the altitude (or a table representative of the relationship between the atmospheric pressure and the altitude).

As above, the communication terminal 3 may compare the reference sensor information acquired from the received positional information with values acquired from the own sensor part to automatically correct the positional data acquired from the positional information signal, and thereby acquire the corrected value as the own current position. Therefore, the communication terminal 3 may more accurately acquire the own current position.

If the disposition height of the positional information transmitter 2 and the height of the communication terminal 3 (height of the communication terminal 3 carried by a user) are preliminarily known in such a case that the communication terminal 3 is a portable telephone, the communication terminal 3 subtracts the difference in height from the altitude acquired from the positional information signal to correct the altitude of the current position.

Figure 15:
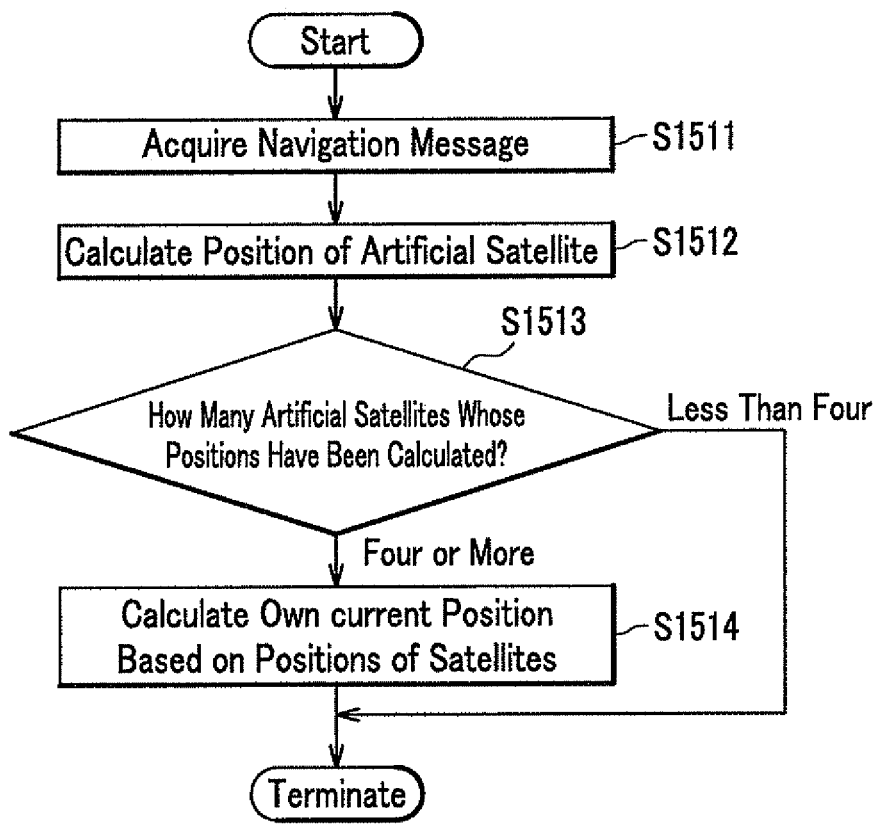
FIG. 15 A process flowchart of a positioning process based on a satellite positioning signal.

FIG. 15 is a process flowchart of the positioning process based on the satellite positioning signal (S1115 in FIG. 12). As shown in FIG. 15, first, the baseband processing part 31 acquires the navigation messages from the received satellite positioning signals (S1511). Then, the baseband processing part 31 calculates positions of the artificial satellites that have transmitted the satellite positioning signals based on the acquired navigation messages (S1512). That is, the baseband processing part 31 finds distances (pseudo ranges) from the communication terminal 3 to the artificial satellites based on the propagation times of electric waves from the artificial satellites 1 to calculate the coordinates of the artificial satellites 1 from the precise orbit information (ephemeris) included in the navigation messages.

Then, the baseband processing part 31 determines whether the number of the artificial satellites 1 the positions of which have been calculated is four or more (S1513). If the number of the artificial satellites 1 the positions of which have been calculated is four or more (S1513: four or more), the process goes to S1514, and if the number of the artificial satellites 1 the positions of which have been calculated is less than four (S1513: less than four), the process is terminated.

At S1514, the baseband processing part 31 selects the four newest satellites among the artificial satellites 1 the positions of which have been calculated and calculates the own current position (latitude, longitude, altitude) from the positions of the four satellites (S1514).

Although the case of two operation modes ("indoor/outdoor" and "indoor") is described in the above (See FIG. 10, FIG. 11), the number of the operation modes is not necessarily limited to two. For example, as shown in FIG. 16, three operation modes ("outdoor", "indoor/outdoor", and "indoor") are available.

Figure 17:
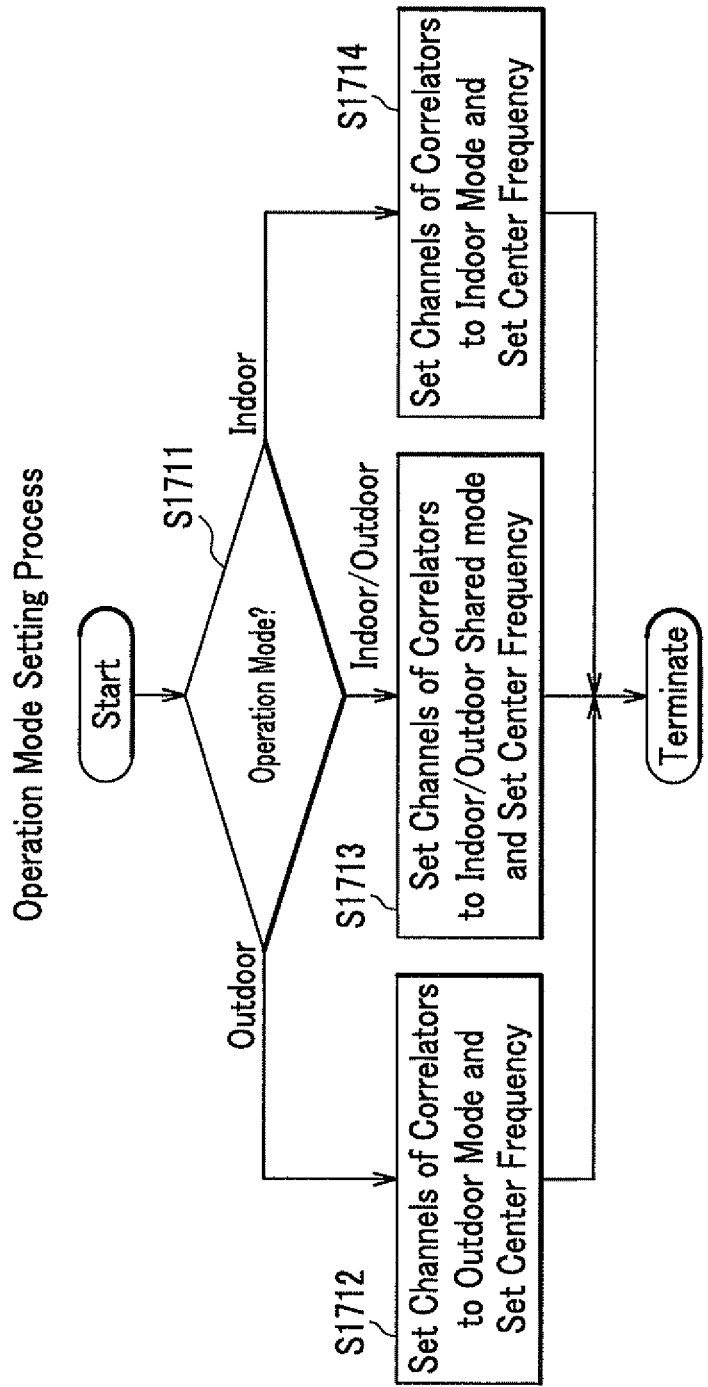
FIG. 17 A variation of an operation mode setting process.

FIG. 17 depicts a variation of the operation mode setting process of FIG. 10 and is a process flowchart of the operation mode setting process in the case of three operation modes. As shown in FIG. 17, the baseband processing part 31 acquires the operation mode currently set in the communication terminal 3 and determines the acquired operation mode (S1711). Next, the baseband processing part 31 sets channels for the radio signals (satellite positioning signal or positional information signal) captured by the correlators of the correlating part 321 and the center frequency depending on the acquired operation mode (S1712, S1713, and S1714).

As shown in FIG. 16, if the operation mode is set to "outdoor" (S1711: outdoor), the baseband processing part 31 sets four correlators (1 to 4) to channels (8 ch, 11 ch, 15 ch, and 20 ch) for the satellite positioning signal and another correlator (5) to a channel (180 ch) for the positional information signal.

If the operation mode is set to "indoor/outdoor" (S1711: indoor/outdoor), the baseband processing part 31 sets two correlators (1 to 2) to channels (8 ch and 11 ch) for the satellite positioning signal and three other correlators (3 to 5) to channels (175 ch, 179 ch, and 180 ch) for the positional information signal of the IMES.

If the operation mode is set to "indoor" (S1711: indoor), the baseband processing part 31 sets only one correlator (1) to a channel (8 ch) for the satellite positioning signal and four other correlators (2 to 5) to channels (174 ch, 175 ch, 179 ch, and 180 ch) for the positional information signal of the IMES.

As in the example shown in FIG. 11, in any operation mode, at least one correlator (the correlator (5) in FIG. 11) is set to a certain channel (180 ch) for the positional information signal.

Even if three operation modes exist, the number of correlators is not limited to five, as in the case of FIG. 11. For example, if the correlating part 321 includes 16 correlators, 14 correlators are set to channels for the satellite positioning signal and two other correlators are set to channels for the positional information signal if the operation mode is "outdoor". If the operation mode is "indoor/outdoor", seven correlators are set to channels for the satellite positioning signal and nine other correlators are set to channels for the positional information signal. If the operation mode is "indoor", two correlators are set to channels for the satellite positioning signal and 14 other correlators are set to channels for the positional information signal.

This is the end of the description of the embodiments. The above description is for the purpose of facilitating the understanding of the present invention and does not limit the present invention. The present invention may be altered or modified without departing from the spirit thereof and, of course, the present invention includes equivalents thereof.

For example, although the communication terminal 3 allocates different channels to the own respective correlators in the above description, a plurality of the own respective correlators may be set to receive the positional information signal of the same channel, and the correlators set to receive the positional information signal of the same channel may search different frequency ranges in a frequency range to be searched that corresponds to the set channel.

Specifically, for example, if a frequency range to be searched that corresponds to the set channel is frequencies f1 to f3, a first correlator is set to search the frequencies f1 to f2 (f1<f2<f3) and a second correlator is set to search the frequencies f2 to f3. Since this causes the searching of the channel to be shared and performed simultaneously by a plurality of correlators and a frequency range to be searched by each correlator becomes narrow, the search time is reduced. As a result, the time required for the communication terminal 3 to acquire the own current position is reduced. The frequency range searched by the first correlator and the frequency range searched by the second correlator are preferably set in such a way that overlapping ranges are reduced as much as possible.

For example, the positional information signal transmitted from a certain positional information transmitter 2 may include channel numbers of other positional information transmitters 2 disposed adjacent to the positional information transmitter 2 and the communication terminal 3 receiving the positional information signal may automatically set the own correlators so as to receive the channels of the channel numbers. This reduces the time required for searching the positional information signal transmitted from the positional information transmitter 2 located on the destination, for example, when the communication terminal 3 is moved and, as a result, the time required for the communication terminal 3 to acquire the own current position is reduced.

In the second embodiment, the mixer 276 mixes the positional information signals generated using the same PRN number. However, each radio transmitting part may include two transmission bit string storage parts 271 and the mixer 276 may mix any two positional information signals selected from all of positional information signals generated using different PRN numbers for a plurality of channels.

In the first embodiment and the second embodiment, the positional information signals are transmitted from the plurality of the antennas 28 simultaneously. However, the positional information signals may be transmitted from the antennas 28 in a time-shifted manner per antenna 28. In such a case, the positional information signals transmitted from the respective antennas 28 do not interfere with each other, and the positional information signals are able to be transmitted from all of the antennas 28 through any one of the channel(s).

The type of the radio signals transmitted from the artificial satellites 1 and the positional information transmitters 2 are not limited to electric waves. For example, the radio signals may be those utilizing light, infrared light, etc.

EXPLANATION OF REFERENCE NUMERAL

S positioning system
1 artificial satellite
2 positional information transmitter
21 data generating part
211 CPU
212 storage part
213 positional information transmission program
214 positional information table
215 positional information message
22 clock part
23 operating part
24 displaying part
25 communication I/F part
26 power source part
27 radio transmitting part
271 transmission bit string storage part
272 modulation clock generating part
273 transmission timing controlling part
274 carrier generating part
275 BPSK modulating part 276 mixer
28 antenna
3 communication terminal (portable communication terminal)
31 baseband processing part
311 CPU
312 storage part
313 operation mode setting program
314 positioning process program
315 position correction program
32 radio receiving part
321 correlating part
322 A/D converting part
323 demodulating part
33 operating part
34 displaying part
35 communication I/F part
36 electric field intensity measuring part
37 clock part
38 power source part
39 antenna
4 construction
41 doorway
601 boundary flag (the boundary area information)
602 latitude (positional data)
603 longitude (positional data)
604 altitude (positional data)

The invention claimed is:

1. A positional information transmitter comprising: a radio transmitter configured to transmit repeatedly a positional information signal from a plurality of antennas spaced apart from each other, the positional information signal compatible with a satellite positioning signal that is a radio signal for positioning transmitted from an artificial satellite, the positional information signal being a radio signal containing position data indicative of a particular position, the positional information transmitter signal informing a communication terminal of the particular position specified by the position data when the communication terminal receives the positional information signal, the radio transmitter configured to transmit from each of the antennas through one of a plurality of channels the positional information signal containing the position data, the positional information signal being transmitted either simultaneously from the antennas through channels of the plurality of channels which are different between the antennas or sequentially in a time-shifted manner from one antenna to another antenna through any one of the plurality of channels, wherein the radio transmitter comprises a plurality of mixers corresponding to the antennas, respectively, and each of the mixers is configured to mix two signals to generate the positional information signal to be transmitted from the corresponding antenna, each of the two signals being generated by sampling a transmission bit string containing the position data at a different sampling period and modulating the sampled transmission bit string into a carrier wave in a predetermined frequency band.

2. The positional information transmitter of claim 1, wherein the positional information signal to be transmitted from the corresponding antenna contains data that represents at least a longitude and a latitude.

3. A positional information transmitter comprising:
a radio transmitter configured to transmit repeatedly a positional information signal from a plurality of antennas spaced apart from each other, the positional information signal compatible with a satellite positioning signal that is a radio signal for positioning transmitted from an artificial satellite, the positional information signal being a radio signal containing position data indicative of a particular position, the positional information transmitter signal informing a communication terminal of the particular position specified by the position data when the communication terminal receives the positional information signal, the radio transmitter configured to transmit from each of the antennas through one of a plurality of channels the positional information signal containing the position data, the positional information signal being transmitted either simultaneously from the antennas through channels of the plurality of channels which are different between the antennas or sequentially in a time-shifted manner from one antenna to another antenna through any one of the plurality of channels, wherein the radio transmitter comprises a plurality of mixers corresponding to the antennas, respectively, and each of the mixers is configured to mix two signals to generate the positional information signal to be transmitted from the corresponding antenna, the two signals being selected from signals generated by sampling transmission bit strings at two different sampling periods, the transmission bit strings containing the position data of one channel or of a plurality of channels, and modulating the sampled transmission bit strings respectively into carrier waves in predetermined frequency bands.

4. The positional information transmitter of claim 1, wherein the two sampling periods are periods for generating two signals having data transfer rates that are in a predetermined range of data transfer rates at which the communication terminal is capable of receiving data, the difference between the data transfer rates being equal to or greater than a predetermined value.

5. The positional information transmitter of claim 1, wherein the carrier waves of the two signals mixed by the mixer have frequencies that are in a frequency band of the satellite positioning signal, the differences of the respective frequencies from the center frequency of the frequency band being equal to or greater than a predetermined value, one of the frequencies being on a plus side relative to the center frequency, the other frequency being on a minus side relative to the center frequency.

6. The positional information transmitter of claim 1, wherein the positional information signal contains boundary area information indicative of the positional information transmitter being disposed near the boundary between an outdoor region and an indoor region.

7. The positional information transmitter of claim 1, wherein the positional information signal further contains reference sensor information used as a reference for correcting the position data.

8. The positional information transmitter of claim 1, wherein the positional information signal is compatible with a satellite positioning signal transmitted from a GPS satellite, and the plurality of channels are constituted by subjecting the positional information signals to spread spectrum processing with a group of predetermined code patterns different from a group of code patterns allotted to the GPS satellites.

9. A positioning system comprising: positional information transmitters as recited in claim 1 and communication terminals, each communication terminal configured to receive a satellite positioning signal and a positional information signal, the satellite positioning signal being a radio signal for positioning transmitted from an artificial satellite and the positional information signal being compatible with the satellite positioning signal, the positional information signal being a radio signal containing positional data indicative of a particular position, the communication terminal configured to position the own current position based on the received satellite positioning signal and the received positional information signal, the communication terminal comprising a plurality of correlators for searching the received positional information signal through respective channels, two or more of the correlators configured to search simultaneously a predetermined frequency range as a whole to be searched for each channel, each of the two or more correlators searching different frequencies.

10. The positioning system of claim 9, wherein the communication terminal comprises a sensor configured to acquire sensor information used for correcting the positional data, and determines the own current position by acquiring reference sensor information serving as a reference for correcting the positional data based on the positional information signal and comparing the sensor information acquired by the sensor and the reference sensor information with each other to correct the positional data.

11. A positioning system comprising: positional information transmitters as cited in claim 1 and communication terminals, the positional information transmitters being disposed respectively in unit areas, the unit areas being commensurate with the required positioning accuracy, and the communication terminals configured to receive the satellite signal and the positional information signal and to determine the own current position based on the received satellite positioning signal and the received positional information signal, the adjacent positional information transmitters configured to transmit the positional information signals without using the same channel.

\* \* \* \* \*